May 5, 1970  P. K. BALLARD  3,509,967
SYSTEM FOR TREATING CRANKCASE VAPORS IN AUTOMOTIVE ENGINES
Filed Oct. 24, 1967
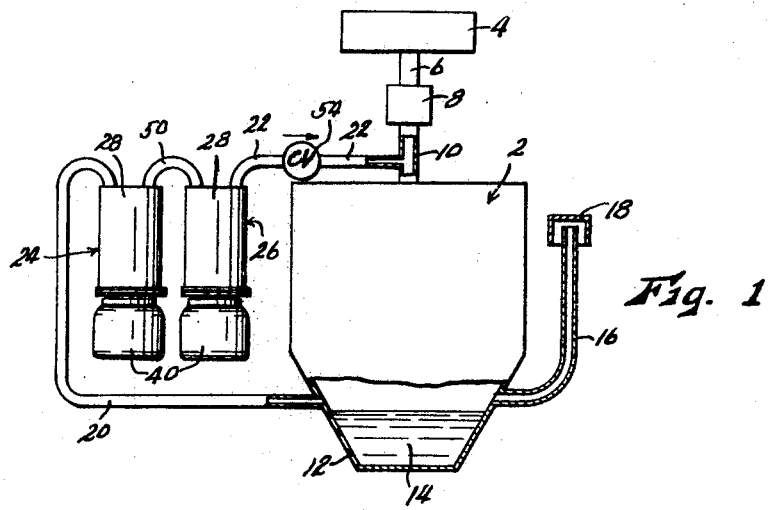
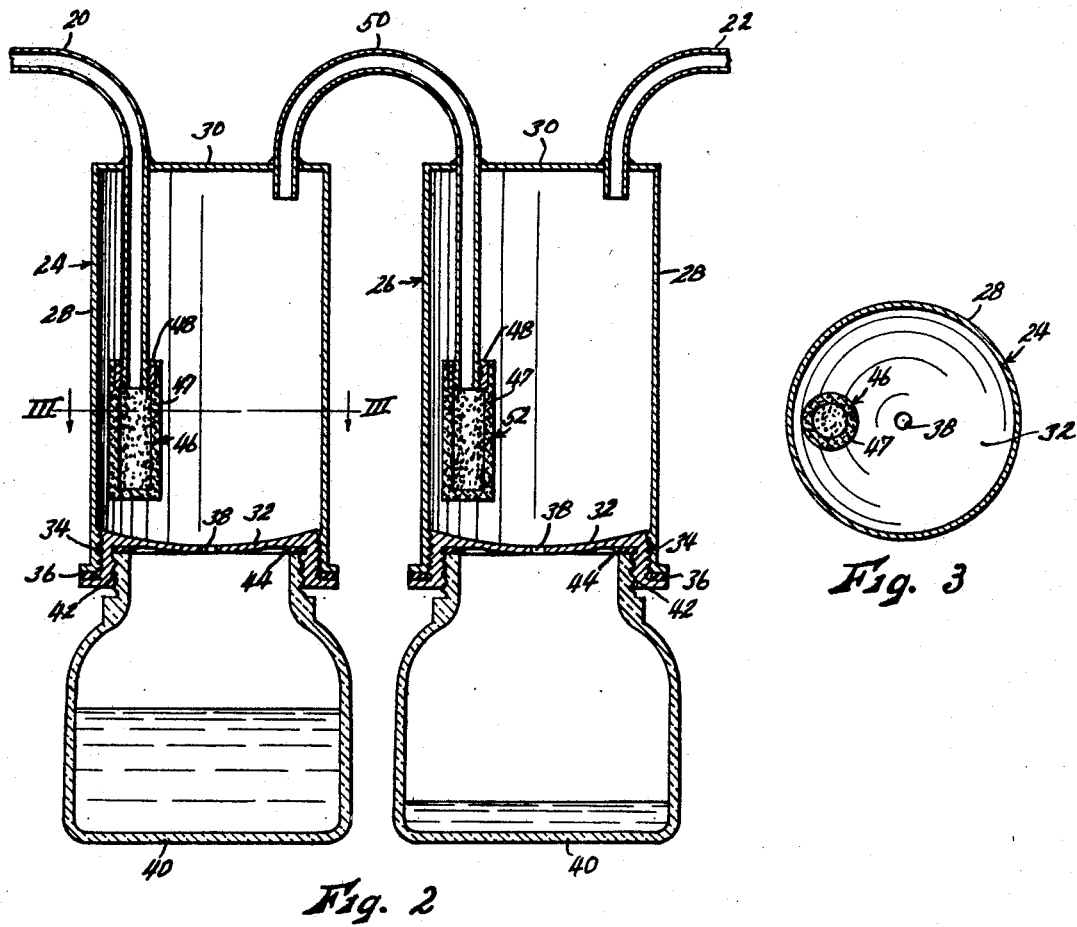
INVENTOR.
Paul K. Ballard
BY John A. Hamilton
Attorney.

United States Patent Office 3,509,967
Patented May 5, 1970

3,509,967
SYSTEM FOR TREATING CRANKCASE VAPORS IN AUTOMOTIVE ENGINES
Paul K. Ballard, 3708 Haskell,
Kansas City, Kans. 66104
Filed Oct. 24, 1967, Ser. No. 677,541
Int. Cl. F16n *39/06;* F01m *1/10*
U.S. Cl. 184—6         3 Claims

ABSTRACT OF THE DISCLOSURE

A system for treating crankcase vapors in automotive engines consisting of a conduit extending from the engine intake manifold to the crankcase, above the oil level in the latter, whereby crankcase vapors are drawn through said conduit by the engine intake vacuum, a cooling condenser and filter interposed in said conduit whereby the major portion of said vapors are reduced to liquid form and solid impurities are removed therefrom, and means for collecting said liquid and solid impurities for disposal, any remaining vapor being drawn into the engine for burning therein.

---

This invention relates to new and useful improvements in systems for treating crankcase vapors in automotive engines, and has as its principal object the provision of such a system which will greatly reduce the quantity of smog-producing elements in the engine exhaust. A secondary object is the provision of a system of the character described which will actually improve the performance of the engine itself, as compared to systems already in use.

It is well known that the lubricating oil in the crankcases of automotive engines tends to become vaporized, due both to engine heat and to the turbulence thereof during engine operation. Substantially all crankcases are vented to the atmosphere so that the crankcase vapors normally pass off to the atmosphere, and are known to be a major source of smog in heavily populated areas of the country. The vapors also include carbon, solid products of combustion, and other solid foreign matter, these solids being drawn into the crankcase from the atmosphere by the crankcase ventilation system, and also as a result of "blow-by" of the products of combustion from the cylinders past the pistons into the crankcase.

A solution to this problem has been previously proposed which involves a conduit interconnecting the crankcase, at a point above the oil level therein, with the engine intake manifold, by means of a conduit disposed exteriorly of the engine. The intake vacuum of the engine thus provides a forced ventilation of the crankcase, drawing vapors therefrom through said conduit, intermixing them with the air-gas mixture from the carburetor, and feeding them together with said air-gas mixture back into the combustion chambers of the engine cylinders, where they are hopefully burned together with the air-gas mixture. This cross-connection of the crankcase and intake manifold is as a matter of fact required by law in certain heavily smog-infested areas. However, this solution is quite incomplete and has undesirable side effects. While of course reducing the amount of completely burned hydrocarbons discharged to the atmosphere, and hence providing a partial answer to the smog problem, it will be apparent that the oil vapor does not have a sufficiently high volatility to burn completely under conditions existing in the engine cylinders, and that as a consequence a certain amount of unburned vapor will still be discharged to the atmosphere through the engine exhaust system. Furthermore, the incomplete combustion of the oil in the vapor results in an accumulation of unburned hydrocarbons in the engine itself, causing a "dirty" engine with resultant fouling of spark plugs, reduction of efficiency, and a heavy, sluggish operation of the engine, with a tendency to stall, particularly at low or idling operating speeds. The recycling of solid impurities through the engine also tends to foul it and reduce its efficiency.

The objects of the present invention are accomplished in connection with a conduit interconnecting the crankcase with the intake manifold as described above, but with the further insertion in said conduit of one or more cooling condensers, together with filter or strainer units, so that all or a large portion of the crankcase vapors are condensed to liquid form, and the solid foreign matter removed, said liquid and solid material being trapped for easy disposal, and hence not recirculated to the engine. Thus a far greater reduction of smog-producing elements in the engine exhaust is obtained, and the engine remains much cleaner and operates with greater efficiency.

Another object is the provision of a device of the character described wherein a single unit serves the functions both of filtering or straining solid foreign matter from the vapor, and also of condensing the volatile elements of the vapor to liquid form.

Other objects are simplicity and economy of construction, efficiency and economy of construction, efficiency and dependability of operation, and ease and convenience of service and maintenance.

With these objects in view, as well as other objects which will appear in the course of the specification, reference will be had to the accompanying drawing wherein:

FIG. 1 is a partially diagrammatic layout of a system for treating crankcase vapors of automotive engines, as contemplated by the present invention, FIG. 2 is an enlarged vertical sectional view through the condenser-filter units shown in FIG. 1, and FIG. 3 is a sectional view taken on line III—III of FIG. 2.

Like reference numerals apply to similar parts throughout the several views, and the numeral 2 applies to an automotive engine, shown diagrammatically but well understood in the art, including therein pistons operable in cylinders to create a vacuum tending to draw air inwardly through an air intake filter 4 through a conduit 6 and carburetor 8, wherein it is intermixed with vaporized gasoline to form an air-gas mixture, and thence through an intake manifold 10 by which said mixture is distributed to the various cylinders of the engine to be burned therein to drive the engine in the well-known manner. In the lower portion of the engine there is provided a crankcase 12 containing lubricating oil 14, it being understood that the engine includes pumping means for circulating said oil to lubricate working parts of the engine. There is provided a filler pipe 16 through which oil may be added to the crankcase, said filler pipe being provided with a breather cap 18 which also permits air to enter the crankcase.

In the system contemplated by the present invention, there is also provided a conduit pipe 20 interconnected at one end into crankcase 12 above the oil level therein, and a conduit pipe 22 interconnected at one end into intake manifold 10 of the engine. Pipes 20 and 22 are interconnected to each other through a pair of condenser-filter units disposed in series, said units being indicated generally by the numerals 24 and 26.

Each condenser-filter unit includes a housing indicated by the numeral 28, said housing being cylindrical with a vertical axis, being closed at its upper end by an end wall 30, and being formed preferably of thin sheet metal. Said housing is internally threaded at its lower end, and is closed by an externally threaded cap member 32 screwed therein, the threaded connection being indicated at 34, and sealed by means of gasket 36. The upper surface of each cap 32 is concavely curved, and a hole 38 is formed therethrough at the lowest point of said curvature. Cap 32 is also internally threaded, and a collection bottle 40 having an externally threaded neck is screwed therein, the threaded connection being indicated at 42, and sealed by a gasket 44. Said bottle is preferably formed of glass or other transparent material. Hole 38 of cap 32 provides interconnection between housing 28 and bottle 40.

Conduit pipe 20 from crankcase 12 projects through top end wall 30 of condenser-filter unit 24, being sealed therein, and extends downwardly in housing 28 thereof. Affixed to the lower end of said pipe within housing 28, is a porous filter member 46 which is hollow, receiving air and vapor into the interior thereof through pipe 20. Said filter unit may be of any suitable type, including fiber glass, paper or fiber, but as shown consists of a cup-like body 47 of ceramic material provided at its open end with a threaded ferrule 48 molded therein by means of which it may be threadably secured to the lower end of pipe 20. The filter passages or pores of the filter unit should be sufficiently large to pass both air and liquid, but sufficiently small to block the passage of very small particles of solid foreign matter. A pipe 50 has one end thereof inserted through end wall 30 of unit 24, being sealed therein to communicate with the upper portion of housing 28 of said unit, and its opposite end portion is inserted through end wall 30 of unit 26, being sealed in said end wall and extending downwardly in housing 28 of unit 26. A filter unit 52 corresponding in all respects to filter unit 46 is secured to the lower end of pipe 50. Conduit pipe 22 extends through top wall 30 of unit 26, being sealed therein to communicate with the upper portion of housing 28 of said unit.

Interposed in conduit pipe 22 intermediate condenser-filter unit 26 and intake manifold 10, is a check valve 54 operable to permit flow of air and vapor toward said manifold, but to prevent flow in a reverse direction. Condenser-filter units 24 and 26 are of course mounted exteriorly of the engine 2, by any suitable means, preferably in as cool a portion as possible of the engine compartment, or in any other suitable location.

As previously discussed, operation of the engine causes a portion of the oil 14 in crankcase 12 to be vaporized, due to engine heat and a high degree of turbulence of said oil. Also, the vapor may have a quantity of solid foreign matter entrained therein, said solid matter being drawn into the crankcase through filler pipe 16, or blown past the pistons into the crankcase by the explosions occurring in the cylinders. Operation of the engine creates a suction or vacuum intake manifold 10. This vacuum of course pulls an air-gas mixture from carburetor 8 through the manifold 10 into the engine cylinders for combustion in said cylinders, but in connection with the present invention it also sucks air into filler pipe 16 around breather cap 18 and thence into crankcase 12, where it is intermixed and entrained with the vapors in said crankcase. The air-vapor mixture is then drawn through pipe 20 into filter member 46 of condenser-filter unit 24, and flows through said filter unit into housing 28 of said unit. Said filter member has a positive resistance to the flow of air and vapor therethrough, thus creating a pressure drop across said filter member. As the vapor passes through the filter member and expands into the relatively large volume of housing 28, it is cooled by said expansion, with the result that it tends to condense to liquid form, draining down the outer surface of the filter unit and down the interior walls of housing 28, and dripping or flowing to the upper surface of lower end cap 32 of the housing, on which it flows by virtue of the concave curvature of said cap to hole 38, through which it draws into the associated bottle 40 and is collected there. Thus, within chamber 28, the liquid never collects on the filter member or housing walls in greater than film thickness. This is important since there is a quite considerable air turbulence in housing 28, and if the liquid were allowed to accumulate in a pool therein, it would tend to be so agitated by said turbulence as to be again reduced to spray or vapor form and hence drawn by the air flow to downstream portions of the system, thus defeating to some degree the primary purpose of the system. The concavity of cap 32 tends to prevent the accumulation of liquid of any substantial depth even on the floor of the housing. The liquid, principally oil, of course accumulates to a substantial depth in bottle 40, but in the bottle is protected from turbulence by the narrow constriction of hole 38. Actually, each of the condenser-filter units 24 and 26 will condense and remove a substantial quantity of oil even if filter members 46 and 52 are removed, since the vapors expand considerably and are hence cooled to some degree simply by the fact that they pass from the restricted entry pipes 20 or 50 into the relatively large volumes of housings 28. However, the filter members greatly increase the expansive cooling effect, and hence promote a much greater condensing efficiency than would be possible without them.

Filter members 46 and 52 also function as strainers operable to remove all but the smallest particles of solid foreign matter which may be entrained with the air and vapor passing therethrough, so that said solid matter is not re-introduced into the engine. As previously discussed, such solid matter may be drawn in through filler pipe 16, or may be blown past the pistons into the crankcase. The re-introduction of solid foreign matter into the engine of course has the deleterious effects already mentioned. As a matter of fact, it has been observed that due to the cooling of the vapors which begins immediately when they leave the crankcase through pipe 20, and to the reduced turbulence in said pipe, some condensation occurs even before the vapors pass through filter member 46 and liquid oil tends to accumulate inside the hollow body 47 of said filter member. This creates no special problems. The pores of the filter are large enough to pass liquid oil, though of course less freely than air or vapor. If the filter member partially fills with oil, this reduces the area of the filter available for the passage of air and vapors, and the pressure drop across the filter increases, and the added pressure differential effectively forces the liquid oil therethrough, though of course not the solid matter. Thus a condition of balance is reached in which the added pressure drop across the filter occasioned by partial filling thereof is just sufficient to force liquid oil therefrom at the same rate it collects therein.

After the air and vapor have passed through filter member 46 into housing 28 of unit 24, the air, together with the vapor still not condensed passes through pipe 50 into unit 26 and through filter member 52 into housing 28 of said unit. Thus unit 26 performs precisely the same functions as unit 24, condensing and trapping still more of the vapor in liquid form, and straining still more of any solid matter still entrained therewith. Obviously, any number of units similar to units 24 and 26 could be connected in series to remove still more vapor and solid matter in successive steps. However, two units in series, as shown, have been found to be quite adequately effective, additional units having been found to remove only negligible additional amounts of oil and solid matter.

Air, together with any small amount of vapor still remaining therein, leaves housing 28 of unit 26 through pipe 22. The connections of the intake ends of pipes 50 and 22 into the upper portions of their respective housings 28 tends to prevent any actual oil droplets forming in said chambers, and also solid matter, from being drawn further through the system, said droplets and solid matter instead tending to fall by gravity to the lower portions of the housings for collection in bottles 40. Air and vapor entering pipe 22 are conveyed thereby through check valve 54 into intake manifold 10 of the engine and hence into the engine cylinders, when the oil vapor is burned in the explosions of the air-gasoline mixture in said cylinders. Thus any such remaining vapor is not vented or exhausted to the atmosphere unburned. The oil vapor, being of relatively low volatility as compared to the gasoline, will not be burned completely, but the quantity of oil vapor so introduced to the cylinders by the present system is extremely low as compared to presently existing systems wherein all of the crankcase vapors are drawn into the cylinders. Automotive engines can, and in fact usually do if from no other source than the lubrication or the cylinder walls, accommodate the burning of small amounts of oil in the cylinders without serious ill effects. Thus, with the present system, as compared to pre-existing systems, far lower concentrations of smog-producing elements are exhausted to the atmosphere, and furthermore the engine is kept far cleaner, more efficient and more smoothly operating.

The transparency of bottles 40 permits easy observation of their contents, so that they may be unscrewed from caps 32 and their contents disposed of when required. Also, at periodic intervals caps 32 may be unscrewed from housings 28 to provide access to filter members 46 and 52, for removal and replacement of said members when they become clogged with solid foreign matter.

Check valve 54 is a safety device operable, in the event a mistimed explosion or "backfire" should occur in any cylinder of the engine while the intake valve thereof is open, to prevent the resulting fire from travelling through system in a direction opposite to the normal flow thereof to cause fire or explosion either in housings 28 of the condenser-filter units 24 and 26, or in the engine crankcase itself.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A system for treating crankcase vapors of an automotive engine having a crankcase containing oil and an air inlet to said crankcase, said system comprising:
    (a) a conduit interconnected at one end into said crankcase above the oil level therein and at its opposite end into the intake manifold of said engine, whereby the vacuum in said manifold draws oil vapors and other crankcase vapors through said conduit,
    (b) a plurality of enlarged housings interposed in series in said conduit and disposed exteriorly of said engine, whereby said vapors are expanded, and hence cooled and condensed, in said housings, and
    (c) a hollow filter member disposed within each of said housings and having its interior interconnected with the inlet of said housing, whereby air and vapor entering said housing must pass through said filter member, whereby solid foreign matter entrained in said air and vapor is trapped, the pores of said filter member being sufficiently small to create a positive pressure drop therethrough, whereby said vapors are further expanded, and hence further cooled and condensed, by their passage through said filter member, but sufficiently large to permit the flow of liquid therethrough.

2. A system for treating crankcase vapors of an automotive engine having a crankcase containing oil and an air inlet to said crankcase, said system comprising:
    (a) a conduit interconnected at one end into said crankcase above the oil level therein,
    (b) means for producing a vacuum at the opposite end of said conduit whereby oil vapor and other crankcase vapors are drawn through said conduit,
    (c) an enlarged housing interposed in said conduit and disposed exteriorly of said engine whereby said vapors are expanded, and hence cooled and condensed, in said housing, said housing comprising a hollow body member having ends of said conduit sealed therein to communicate with the interior thereof to form an inlet and an outlet therefor respectively, said body member being sealed and airtight except for said inlet and outlet, and except that it is open at its lower end, a cap member releasably secured to the lower end of said body member in sealing relation therewith, whereby to form the floor of said body member, and having a restricted orifice formed therethrough, and a container releasably secured in said cap in sealing relationship therewith, said orifice providing communication between the interiors of said body member and said container, and
    (d) a hollow filter member disposed in said housing and having its interior releasably interconnected with the inlet end of said conduit within said body member, whereby air and vapor entering said body member must pass through said filter member, whereby solid foreign matter entrained in said air and vapor is trapped, the pores of said filter member being sufficiently small to create a positive pressure drop through said filter member, whereby said vapors are further expanded, and hence further cooled and condensed, by their passage through said filter member, but sufficiently large to permit the flow of liquid therethrough.

3. A system as recited in claim 2 wherein the upper surface of said cap member is upwardly concave, said orifice being disposed at the lowest point of said concavity.

References Cited

UNITED STATES PATENTS

| | | | |
|---|---|---|---|
| 2,652,819 | 9/1953 | Nusbaum | 123—41.86 XR |
| 3,072,112 | 1/1963 | Roper | 123—41.86 XR |
| 3,236,216 | 2/1966 | Van Dolah | 123—119 |
| 3,246,639 | 4/1966 | Oliver | 123—119 |
| 3,259,117 | 7/1966 | Ritchie | 123—119 |
| 3,257,995 | 6/1966 | Schnabel | 123—41.86 |
| 3,326,198 | 6/1967 | Jackson et al. | 123—119 |
| 3,329,137 | 7/1967 | Ferrell | 123—119 |

FRED C. MATTERN, Jr., Primary Examiner

M. A. ANTONAKAS, Assistant Examiner

U.S. Cl. X.R.
123—119, 41.86